United States Patent
Dick et al.

(10) Patent No.: US 6,958,989 B1
(45) Date of Patent: Oct. 25, 2005

(54) UPLINK SCRAMBLING CODE ASSIGNMENT FOR A RANDOM ACCESS CHANNEL

(75) Inventors: Stephen G. Dick, Nesconset, NY (US); Eldad Zeira, Trumbull, CT (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 09/574,791

(22) Filed: May 19, 2000

Related U.S. Application Data

(60) Provisional application No. 60/134,880, filed on May 19, 1999.

(51) Int. Cl.[7] .................................. H04J 3/00
(52) U.S. Cl. ............................. 370/342; 370/345
(58) Field of Search ........................ 370/342, 345, 370/350, 347

(56) References Cited

U.S. PATENT DOCUMENTS

| | | | | |
|---|---|---|---|---|
| 5,430,760 A | * | 7/1995 | Dent | 375/144 |
| 5,790,534 A | * | 8/1998 | Kokko et al. | 370/335 |
| 6,005,852 A | * | 12/1999 | Kokko et al. | 370/329 |
| 6,163,533 A | * | 12/2000 | Esmailzadeh et al. | 370/342 |
| 6,259,724 B1 | * | 7/2001 | Esmailzadeh | 375/143 |
| 6,381,229 B1 | * | 4/2002 | Narvinger et al. | 370/328 |
| 6,442,153 B1 | * | 8/2002 | Dahlman et al. | 370/342 |
| 6,526,091 B1 | * | 2/2003 | Nystrom et al. | 375/142 |
| 6,567,482 B1 | * | 5/2003 | Popovic' | 375/343 |
| 6,570,889 B1 | * | 5/2003 | Stirling-Gallacher et al. | 370/479 |
| 6,577,615 B1 | * | 6/2003 | Ritter et al. | 370/342 |
| 6,587,672 B1 | * | 7/2003 | Chuah et al. | 455/69 |
| 6,631,124 B1 | * | 10/2003 | Koorapaty et al. | 370/337 |
| 6,643,275 B1 | * | 11/2003 | Gustafsson et al. | 370/328 |
| 6,724,813 B1 | * | 4/2004 | Jamal et al. | 375/219 |
| 6,738,638 B1 | * | 5/2004 | Moulsley | 455/517 |

* cited by examiner

*Primary Examiner*—Man U. Phan
*Assistant Examiner*—Toan Nguyen
(74) *Attorney, Agent, or Firm*—Volpe and Koenig, P.C.

(57) ABSTRACT

A user equipment transmits a data packet using a selected signature in a time slot of a radio frame within a superframe of a random access channel. The superframe being time divided into radio frames. A base station identifies the selected signature, transmission time slot and transmission radio frame of the data packet. The base station determines an uplink scrambling code for the user equipment based on in part the identified signature, transmission time slot and transmission radio frame. The base station selectively transmits an acknowledgment message based on in part an availability of the determined uplink scrambling code. The user equipment receives the acknowledgment message and transmits a subsequent data packet using the determined uplink scrambling code.

16 Claims, 3 Drawing Sheets

UPLINK SCRAMBLING CODE ASSIGNMENT FOR A RANDOM ACCESS CHANNEL

This application claims priority from U.S. Provisional Application No. 60/134,880, filed May 19, 1999.

BACKGROUND

The invention relates generally to resource allocation in a wireless code division multiple access (CDMA) communication system. More specifically, the invention relates to assigning uplink scrambling codes in a CDMA communication system.

FIG. 1 depicts a wireless spread spectrum Code Division Multiple Access (CDMA) communication system 20. A base station 22 communicates with user equipment (UE) $24_1$–$24_n$ in its operating area. In a spread spectrum CDMA system 20, data signals are communicated between UEs $24_1$–$24_n$ and the base station 22 over the same spectrum. Each data signal in the shared spectrum is spread with a unique chip code sequence. Upon reception, using a replica of the original chip code sequence, a particular data signal is recovered.

Since signals are distinguished by their chip code sequences (code), separate dedicated communication channels are created using different codes. Signals from the base station 22 to the UEs $24_1$–$24_n$ are sent on downlink channels and signals from the UEs $24_1$–$24_n$ to the base station 22 are sent on uplink channels. For coherent detection of downlink transmissions by the UEs $24_1$–$24_n$, pilot signals are transmitted to all of the UEs $24_1$–$24_n$ within the base station's operating range. The UEs $24_1$–$24_n$ condition their receivers based on the pilot signals to enable data reception.

In many CDMA systems, a random access channel, such as the common packet channel (CPCH), is used for some uplink transmissions. A CPCH is capable of carrying packets of data from different UEs $24_1$–$24_n$. Each packet is distinguishable by its code. For detection by the base station 22, the packets have a preamble which also distinguishes it from other packets. The CPCH is typically used to carry infrequently communicated data at high rates.

FIG. 2 illustrates a CPCH time slot and frame structure. The CPCH structure is time divided into radio frames $30_1$–$30_m$ having time slots $28_1$–$28_n$, such as eight time slots proposed for the Third Generation Mobile Telecommunications System (IMT-2000)-UMTS. A radio frame $30_1$–$30_m$ in IMT-2000 is 10 milliseconds in duration and each time slot is 1.25 ms. The radio frames $30_1$–$30_m$ are grouped into superframes 32. Each superframe 32 has a fixed number of radio frames $30_1$–$30_m$, such as 72 radio frames in IMT-2000.

To allow more than one UE $24_1$–$24_n$ to use a given time slot $28_1$–$28_n$, multiple signatures are used to distinguish the UEs $24_1$–$24_n$. In IMT-2000, sixteen different signatures are used. A particular signature used within a particular time slot is referred to as an access opportunity. FIG. 3 illustrates the access opportunities $26_{11}$–$26_{nm}$ of the CPCH. For instance, as proposed for IMT-2000, for each of the 8 time slots, one out of 16 signatures is available to be chosen, resulting in 128 access opportunities. Each access opportunity $26_{11}$–$26_{nm}$ is preassigned an uplink scrambling code. The scrambling code is a function of the time slot $T_K$ and the signature $S_K$ that the UE used for access. Accordingly, the uplink scrambling code, $C_K$, is a function of the time slot, $T_K$, and signature, $S_K$, of the access opportunity $26_{11}$–$26_{nm}$ as in Equation 1.

$$C_K = 8 * T_K + S_K \quad \text{Equation 1}$$

The UE $24_1$ transmits a data packet using a selected access opportunity $26_{11}$–$26_{nm}$. Upon identifying a particular access opportunity $26_{11}$–$26_{nm}$, the base station 20 sends out an acknowledgment message (ACK) if the corresponding scrambling code is available. The ACK message may be one of several types, such as simply being a downlink transmission of the signature associated with the UE's access attempt. If the scrambling code is not available, a negative acknowledgment (NAK) is sent. After receiving the appropriate ACK message, the UE $24_1$ selects the proper uplink scrambling code to transmit the packet data on the CPCH. If the UE $24_1$ receives a NAK, it will re-attempt access by transmitting another packet.

This approach for assigning uplink scrambling codes has drawbacks. A typical scrambling code is only 10 ms in length. A transmitted data packet may last more than one radio frame 30. Since a data packet may last for multiple radio frames, the scrambling code used for that packet can only be reassigned after the transmission of that packet is complete. As a result, the number of CPCH users is limited by the number of scrambling codes assigned to the access opportunities $26_{11}$–$26_{nm}$, such as 128 scrambling codes. Additionally, if a second user uses the same access opportunity $26_{11}$–$26_{mn}$ as an already transmitting first user, the second user will receive a NAK. Repeated negative access attempts lower the efficiency of the system 20 which is undesirable.

Accordingly, it is desirable to use alternate scrambling code assignment schemes.

SUMMARY

A user equipment transmits a data packet using a selected signature in a time slot of a radio frame within a superframe of a common packet channel. The superframe being time divided into radio frames. A base station identifies the selected signature, transmission time slot and transmission radio frame of the data packet. The base station determines an uplink scrambling code for the user equipment based on in part the identified signature, transmission time slot and transmission radio frame. The base station selectively transmits an acknowledgment message based on in part an availability of the determined uplink scrambling code. The user equipment receives the acknowledgment message and transmits a subsequent data packet using the determined uplink scrambling code.

DETAILED DESCRIPTION OF THE PREFERRED EMBODIMENTS

Figure 4:
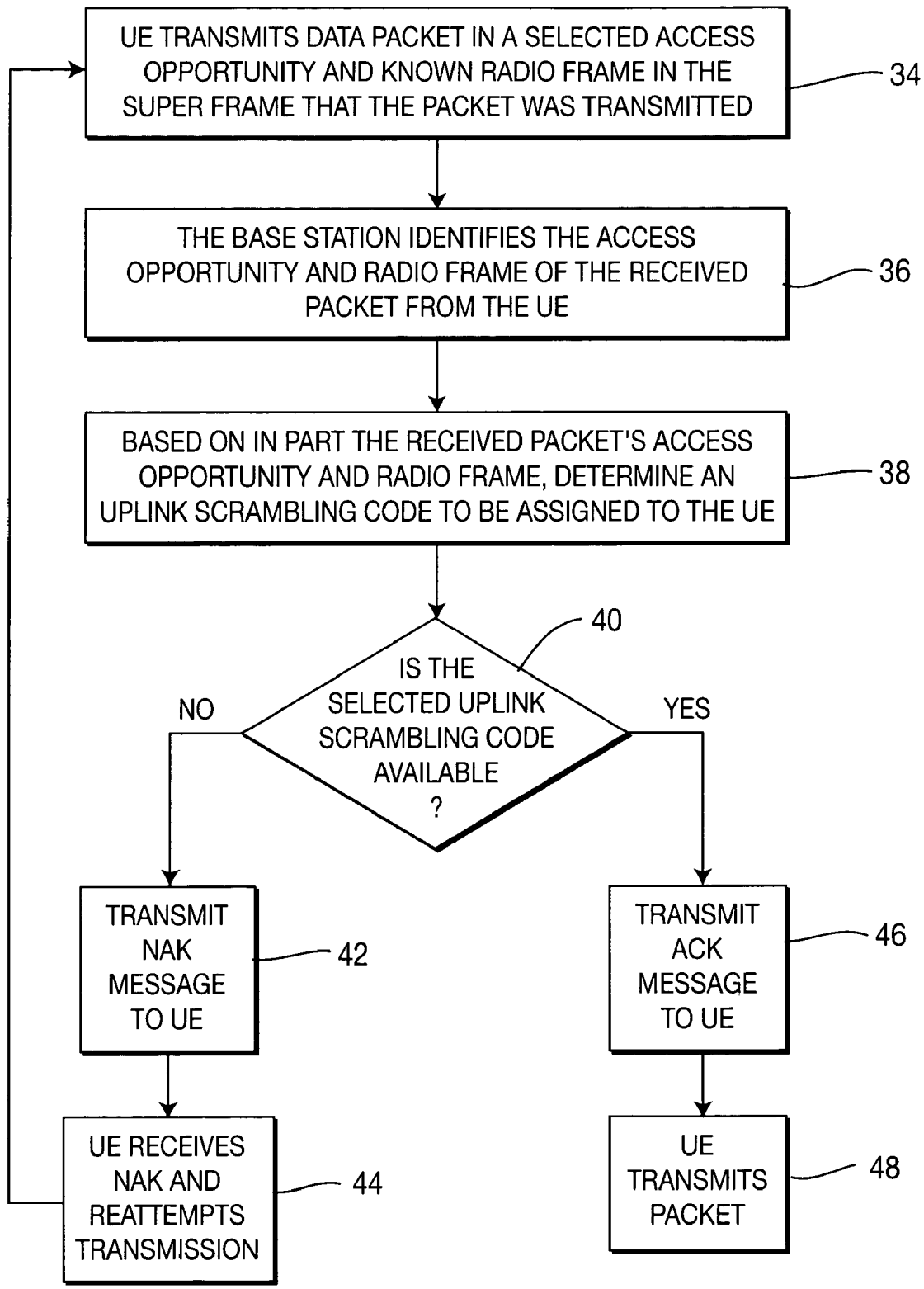
FIG. 4 is a flow chart of uplink scrambling code assignment.

FIG. 4 is a flow chart of uplink scrambling code assignment. To initiate communications with the base station 22, a UE $24_1$ transmits a data packet over the random access channel, such as a CPCH. The packet is transmitted with a selected access opportunity $26_{11}$–$26_{nm}$. The selected access opportunity $26_{11}$–$26_{nm}$ is defined by its signature and time slot in a radio frame $30_1$–$30_m$. The UE $24_1$ also knows which radio frame $30_1$–$30_m$ within the superframe and access opportunity $26_{11}$–$26_{nm}$ the packet was transmitted, 34. For instance, in a system $30_1$–$30_m$ having a superframe 32 of seventy-two radio frames $30_1$–$30_m$, an access opportunity $26_{11}$–$26_{nm}$ using code 2 in time slot 4 sent in the twentieth radio frame in the superframe sequence is known by the UE $24_1$.

The base station 22 identifies the access opportunity $26_{11}$–$26_{nm}$ and the radio frame 30 within the superframe 22 in which the packet was transmitted, 36. The uplink scrambling codes are assigned based on a function of the selected access opportunity $26_{11}$–$26_{nm}$ and radio frame $30_1$–$30_m$ used by the UE $24_1$ for the packet as in Equation 2, 38.

$$C_K = g(F_K, T_K, S_K) \quad \text{Equation 2}$$

$F_K$ is the transmitted packet's radio frame $30_1$–$30_m$ within the superframe 32. Using Equation 2, the number of uplink scrambling codes that may be assigned is dramatically increased. For a system using eight time slots, sixteen signatures and seventy-two radio frames within the superframe 32, the possible uplink scrambling code assignments increases from a maximum of 128 to 9,216. By increasing the available scrambling coues, the number of users capable of utilizing the CPCH is increased. Although increasing the number of available scrambling codes is desirable, it has drawbacks. The codes available to the system 20 is a limited resource and should be allocated conservatively.

One approach to limit the available scrambling codes with no or a negligible decrease in the number of users is to reassign codes after a number of radio frames $30_1$–$30_m$. Some packets may last more than a single radio frame. However, the packet length typically does not exceed a certain number of radio frames $30_1$–$30_m$. Additionally, based on the system 20, the packet length may also be limited as a system parameter. A typical limitation for an IMT-2000 system would be eight radio frames. Since the packet duration is limited or the duration typically does not exceed a limit, the uplink scrambling codes may be repeated after a specified number of radio frames, the limit, L. The limit, L, may be a system design parameter. The limit, L, may also be broadcast or transmitted to the UEs $24_1$–$24_n$ at call setup or on a periodic basis.

For a system using a radio frame limit of L, Equation 3 is a function for such an uplink scrambling code assignment.

$$C_K = g((F_K)_L, T_K, S_K) \quad \text{Equation 3}$$

$(.)_L$ denotes a modulus-L operation. As a result, the uplink scrambling code assignments are repeated every L radio frames. Since no packets or a negligible number of packets exceed the frame limit, L, the number of users using the CPCH is not reduced.

For a system using an eight radio frame limit (L=8), Equation 3 becomes Equation 4.

$$C_K = g((F_K)_8, T_K, S_K) \quad \text{Equation 4}$$

Using Equation 4 in a 16 signature, 8 time slot system, the maximum number of assignable uplink scrambling codes is reduced to 1,024. Using Equations 3 or 4 and the limit, L, the number of necessary uplink scrambling codes is kept to a low level with the number of potential users being increased dramatically.

Using either Equation 3 or 4, the base station 22 determines whether the scrambling code associated with the UE's access attempt is available, 40. If that uplink scrambling code is not available, a NAK message is sent to the UE $24_1$, 42. After receiving a NAK message, the UE $24_1$ will reattempt access, 44.

If the determined uplink scrambling code is available, the base station 22 transmits an ACK message to the UE $24_1$, 46. Subsequently, the UE $24_1$ will transmit packet data using the uplink scrambling code associated with the UE's access attempt.

Figure 1:
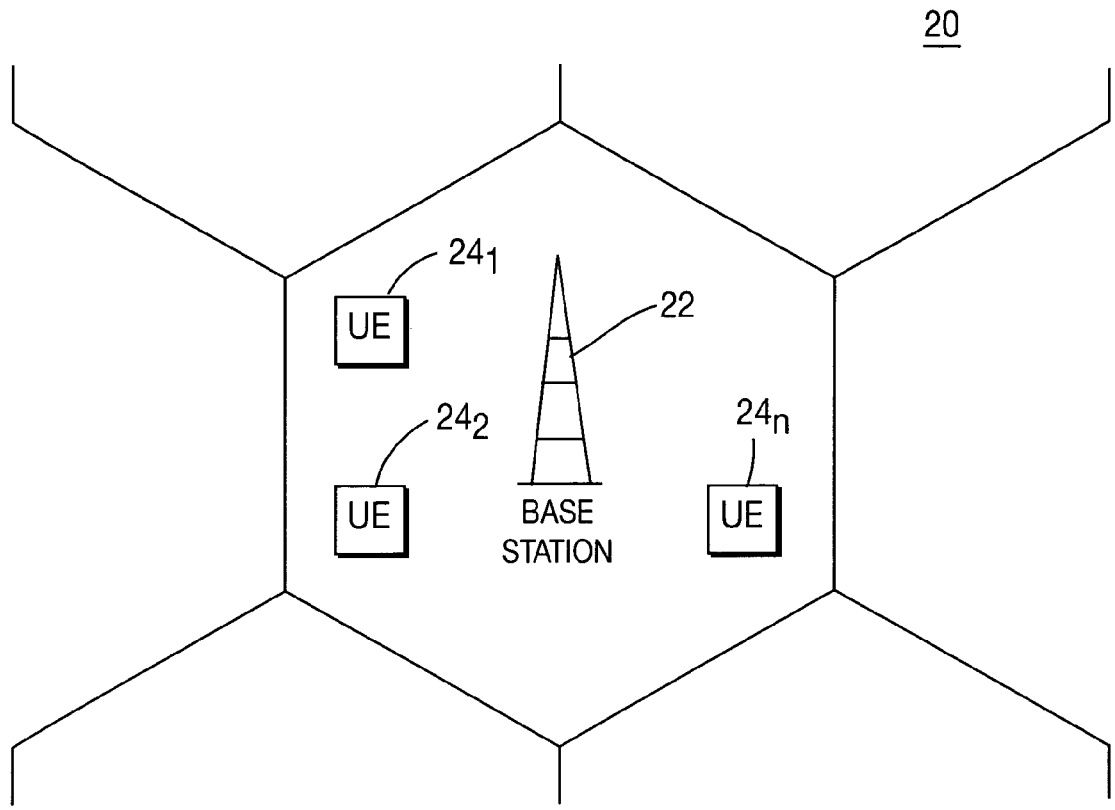
FIG. 1 is an illustration of a typical wireless spread spectrum CDMA communication system
Figure 3:
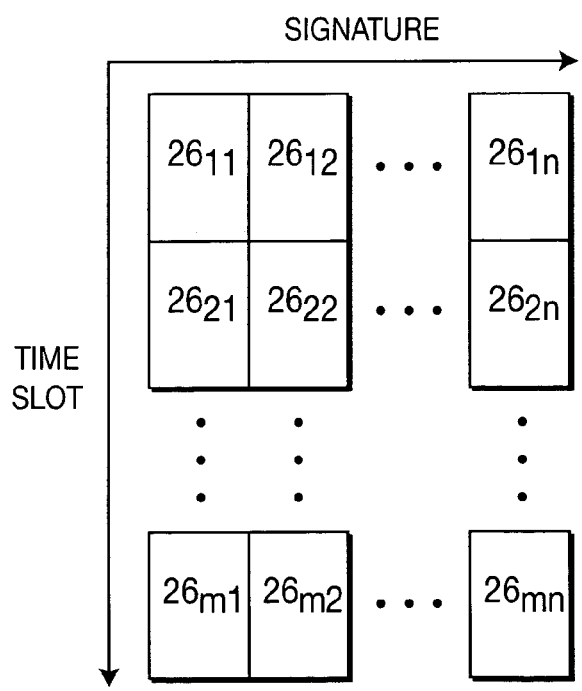
FIG. 3 is an illustration of a random access channel access scheme.
Figure 2:
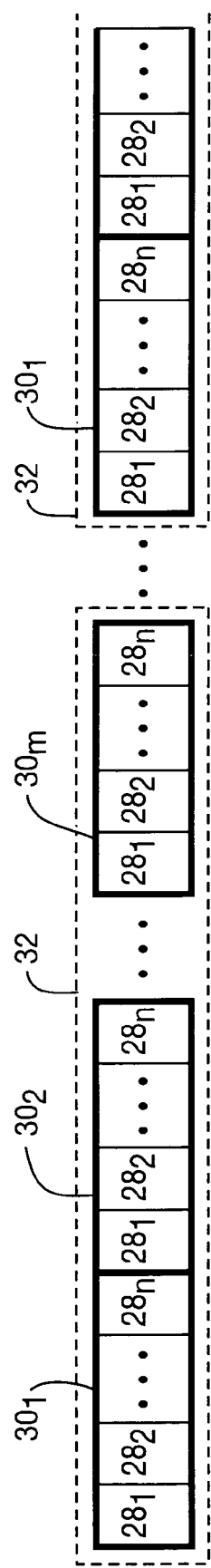
FIG. 2 is an illustration of the time slots, radio frames and superframes of the random access channel.
Figure 2:
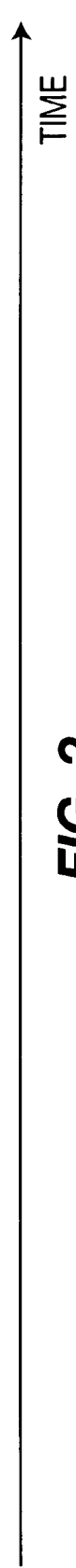
Figure 5:
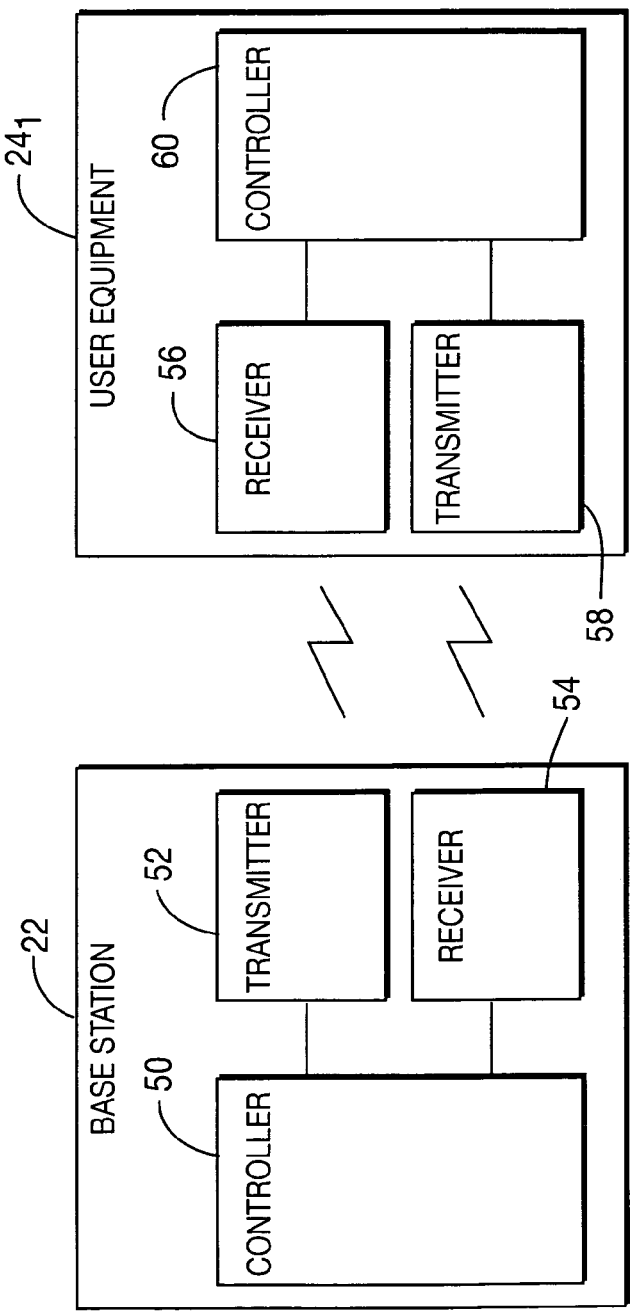
FIG. 5 is a simplified base station and user equipment.

FIG. 5 illustrates a simplified base station 22 and a UE $24_1$ for use in implementing uplink scrambling code assignment. The UE $24_1$ has a controller 60 for determining the scrambling code of the uplink data packets. A UE transmitter 58 sends uplink data packets to the base station 22 based on the determined scrambling code. A UE receiver 56 receives communications from the base station 22.

The base station 22 has a controller 50 for determining the scrambling code of the uplink data packets. A base station transmitter 52 sends communications to the UE $24_1$. The base station receiver 54 receives uplink data packets from the UE $24_1$ using the determined scrambling code.

What is claimed is:

1. A method of assigning uplink scrambling codes for use by a user equipment in transmitting packet data over a random access channel in a code division multiple access communication system, the random access channel being time divided into time slots, the method comprising:
   defining a maximum number L of frames over which a specific data packet can be transmitted;
   defining a set of N predetermined scrambling codes for the random access channel where N>L; and
   defining an association of the predetermined scrambling codes based on time slots, such that when one of the predetermined scrambling codes is associated with a specific time slot, the remaining frames of the set of L frames for the specific time slots are associated with different ones of the predetermined scrambling codes.

2. The method of claim 1 wherein the set of L frames is a system design parameter and no packet may exceed the set of L frames.

3. The method of claim 1 wherein the set of L frames is a number of frames typically not exceeded by a data packet.

4. The method of claim 1 wherein the set of L frames contains a set number of sequential radio frames, each set of sequential radio frames having a set number of time slots.

5. The method of claim 4 wherein the set number of sequential radio frames is eight and the set number of time slots in each set of sequential radio frames is eight.

6. The method of claim 1 wherein the defined association repeats every set of L frames.

7. The method of claim 1 wherein the random access channel is a common packet channel.

8. A controller for assigning scrambling codes for packet data being transferred over a channel in a wireless code division multiple access communication system, the channel being time divided into time slots, the controller comprising:
   means for defining a maximum number L of frames over which a specific data packet can be transmitted;
   means for defining a set of N predetermined scrambling codes for the channel where N>L; and
   means for defining an association of the predetermined scrambling codes based on time slots, such that when one of the predetermined scrambling codes is associated with a specific time slot, the remaining frames of the set of L frames for the specific time slot are associated with different ones of the predetermined scrambling codes.

9. The controller of claim 8 wherein the controller is used by a base station to assign uplink scrambling codes.

10. The controller of claim 8 wherein the controller is used by a user equipment to determine a scrambling code for uplink communications.

11. The controller of claim 10 wherein the uplink communications are data packets and the channel is a common packet channel.

12. The controller of claim 11 wherein the set of L frames frames contains a set of sequential radio frames, each radio frame having a set number of time slots.

13. The controller of claim 12 wherein the set number of sequential radio frames is eight and the set number of time slots in each set of sequential radio frames is eight.

14. The controller of claim 8 wherein the set of L frames is a system design parameter and no packet may exceed the set of L frames.

15. The controller of claim 8 wherein the set of L frames is a number of frames typically not exceeded by a data packet.

16. The controller of claim 8 wherein the defined association repeats every set of L frames.

* * * * *

UNITED STATES PATENT AND TRADEMARK OFFICE
CERTIFICATE OF CORRECTION

| | | |
|---|---|---|
| PATENT NO. | : 6,958,989 B1 | Page 1 of 2 |
| APPLICATION NO. | : 09/574791 | |
| DATED | : October 25, 2005 | |
| INVENTOR(S) | : Dick et al. | |

It is certified that error appears in the above-identified patent and that said Letters Patent is hereby corrected as shown below:

ON THE TITLE PAGE

Item (56), line 19, insert --3rd Generation Partnership Project (3GPP), "UTRA FDD; Physical Layer \ Procedures," TS 25.214 V1.0.0 (1999-04), pp.1-32--.

IN THE SPECIFICATION

At column 1, line 56, after the word "2611-", delete "26nm" and insert therefor --26mn--.

At column 1, line 59, after the word "2611-", delete "26nm" and insert therefor --26mn--.

At column 1, line 64, after the word "2611-", delete "26nm" and insert therefor --26mn--.

At column 2, line 3, after the word "2611-", delete "26nm" and insert therefor --26mn--.

At column 2, line 67, after the word "2611-", delete "26nm" and insert therefor --26mn--.

At column 3, line 1, after the word "2611-", delete "26nm" and insert therefor --26mn--.

At Column 3, line 4, after the word "2611-", delete "26nm" and insert therefor --26mn--.

At column 3, line 7, after the word "2611-", delete "26nm" and insert therefor --26mn--.

At column 3, line 11, after the word "2611-", delete "26nm" and insert therefor --26mn--.

At column 3, line 11, after the word "superframe", delete "22" and insert therefor --32--.

At column 3, line 14, after the word "2611-", delete "26nm" and insert therefor --26mn--.

At column 3, line 25, after the word "scrambling", delete "coues" and insert therefor --codes--.

At column 4, line 8, after the word "attempt", insert --, 48--.

UNITED STATES PATENT AND TRADEMARK OFFICE
CERTIFICATE OF CORRECTION

PATENT NO. : 6,958,989 B1
APPLICATION NO. : 09/574791
DATED : October 25, 2005
INVENTOR(S) : Dick et al.

It is certified that error appears in the above-identified patent and that said Letters Patent is hereby corrected as shown below:

IN THE CLAIMS

In claim 1, at column 4, line 38, after the word "scrambling", delete "codes." and insert therefor --codes; and assigning one of the scrambling codes to the user equipment based on the defined association of the scrambling codes. --.

In claim 8, at column 5, line 2, after the word "scrambling", delete "codes." and insert therefor --codes; and means for assigning one of the scrambling codes to the user equipment based on the defined association of the scrambling codes. --.

Signed and Sealed this

Second Day of October, 2007

JON W. DUDAS
*Director of the United States Patent and Trademark Office*